US012676323B2

(12) United States Patent
Lee et al.

(10) Patent No.: US 12,676,323 B2
(45) Date of Patent: Jul. 7, 2026

(54) MEMBRANE-ELECTRODE ASSEMBLY AND MANUFACTURING METHOD THEREFOR

(71) Applicant: KOLON INDUSTRIES, INC., Seoul (KR)

(72) Inventors: Ju Sung Lee, Seoul (KR); Nak Won Kong, Seoul (KR); Jung Ho Kim, Seoul (KR); Jun Young Kim, Seoul (KR); Kyoung Sik Nam, Seoul (KR); Chan Mi Park, Seoul (KR); Kah Young Song, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 777 days.

(21) Appl. No.: 18/004,681

(22) PCT Filed: Nov. 18, 2021

(86) PCT No.: PCT/KR2021/016982
§ 371 (c)(1),
(2) Date: Jan. 9, 2023

(87) PCT Pub. No.: WO2022/145728
PCT Pub. Date: Jul. 7, 2022

(65) Prior Publication Data
US 2023/0253581 A1 Aug. 10, 2023

(30) Foreign Application Priority Data
Dec. 31, 2020 (KR) ........................ 10-2020-0188951

(51) Int. Cl.
*H01M 8/0284* (2016.01)
*H01M 8/0258* (2016.01)
(Continued)

(52) U.S. Cl.
CPC ....... *H01M 8/0284* (2013.01); *H01M 8/0258* (2013.01); *H01M 8/0271* (2013.01);
(Continued)

(58) Field of Classification Search
None
See application file for complete search history.

(56) References Cited

U.S. PATENT DOCUMENTS 7,521,145 B2 4/2009 Chang
2008/0096077 A1 4/2008 Oomichi
(Continued)

FOREIGN PATENT DOCUMENTS

CN 102144326 A 8/2011
CN 101405910 B 10/2011
(Continued)

OTHER PUBLICATIONS

Machine translation of WO 2008056615, May 2008.*
(Continued)

*Primary Examiner* — Jonathan Crepeau
(74) *Attorney, Agent, or Firm* — Harvest IP Law, LLP

(57) ABSTRACT

Disclosed are a membrane-electrode assembly and a manufacturing method therefor, in which an electrode is modularized into a degradation-susceptible portion and the remaining portion so as to be conveniently repaired by replacing the degraded module, thereby enabling the reduction of time and costs for maintenance and repair. The membrane-electrode assembly of the present invention comprises: a first electrode; a second electrode; and an electrolyte membrane between the first and second electrodes, wherein the first electrode comprises first and second electrode modules which are separable from each other.

5 Claims, 10 Drawing Sheets

(51) Int. Cl.

| | |
|---|---|
| *H01M 8/0271* | (2016.01) |
| *H01M 8/10* | (2016.01) |
| *H01M 8/1004* | (2016.01) |
| *H01M 8/241* | (2016.01) |
| *H01M 8/2418* | (2016.01) |

(52) U.S. Cl.

CPC ......... *H01M 8/1004* (2013.01); *H01M 8/241* (2013.01); *H01M 8/2418* (2016.02); *H01M 2008/1095* (2013.01)

(56) References Cited

U.S. PATENT DOCUMENTS

| | | | |
|---|---|---|---|
| 2008/0199758 A1 | 8/2008 | Shin | |
| 2009/0053611 A1 | 2/2009 | Scherer | |
| 2009/0117445 A1* | 5/2009 | Sekino | H01M 8/04201 |
| | | | 429/439 |
| 2013/0052565 A1 | 2/2013 | Ridgeway | |

FOREIGN PATENT DOCUMENTS

| | | | |
|---|---|---|---|
| CN | 110364740 A | | 10/2019 |
| EP | 1429408 A1 | | 6/2004 |
| JP | 2005-078975 A | | 3/2005 |
| JP | 2005251589 A | | 9/2005 |
| JP | 2007-516559 A | | 6/2007 |
| JP | 2007-324012 A | | 12/2007 |
| JP | 2008-146932 A | | 6/2008 |
| JP | 2015162309 A | | 9/2015 |
| JP | 2015-176739 A | | 10/2015 |
| KR | 20180086882 A | | 8/2018 |
| WO | 2008/056615 A1 | | 5/2008 |

OTHER PUBLICATIONS

Machine translation of JP 2015176739, Oct. 2015.*
The office action dated Dec. 22, 2023 related to the corresponding Japanese Patent application.
The office action dated May 9, 2025 related to the corresponding European Patent application.

* cited by examiner

MEMBRANE-ELECTRODE ASSEMBLY AND MANUFACTURING METHOD THEREFOR

CROSS REFERENCE TO RELATED APPLICATION(S)

This application is a National Stage of International Application No. PCT/KR2021/016982 filed Nov. 18, 2021, claiming priority based on Korean Patent Application No. 10-2020-0188951 filed Dec. 31, 2020, the disclosures of which are incorporated herein by reference in their entireties.

TECHNICAL FIELD

The present disclosure relates to a membrane-electrode assembly and a fuel cell including the same, and more particularly to a membrane-electrode assembly configured such that an electrode is modularized into a portion vulnerable to degradation and the remaining portion, whereby the membrane-electrode assembly is easily repaired through replacement of a degraded module, and therefore time and expenses for maintenance of the membrane-electrode assembly are reduced, and a method of manufacturing the same.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and eco-friendly characteristics thereof.

The membrane-electrode assembly generally includes an anode (also referred to as a fuel electrode), a cathode (also referred to as an air electrode), and a polymer electrolyte membrane (PEM) disposed therebetween.

When fuel such as hydrogen gas is supplied to the anode, hydrogen ions ($H^+$) and electrons ($e^-$) are generated at the anode as the result of hydrogen oxidation reaction. The generated hydrogen ions are transferred to the cathode via the polymer electrolyte membrane (PEM), and the generated electrons are transferred to the cathode via an external circuit. Oxygen in air supplied to the cathode is bonded with the hydrogen ions and the electrons to be reduced, thereby generating a water.

In general, degradation of an electrode due to long-term operation of a fuel cell mainly occurs at specific portion(s) of the electrode (e.g., a portion of the electrode corresponding to a gas inlet/outlet; hereinafter, referred to as "a portion vulnerable to degradation"), rather than over the entire region of the electrode. When the portion vulnerable to degradation is degraded due to long-term operation of the fuel cell, therefore, it is required to discard or replace the entirety of the electrode or the entirety of a membrane-electrode assembly, even though the remaining portion can normally function as the electrode, which increases time and expenses for maintenance of the membrane-electrode assembly and incurs waste of resources as well.

DISCLOSURE

Technical Problem

Therefore, the present disclosure relates to a membrane-electrode assembly capable of solving problems due to limitations and shortcomings of the related technology described above, and a method of manufacturing the same.

An aspect of the present disclosure is to provide a membrane-electrode assembly configured such that an electrode is modularized into a portion vulnerable to degradation and the remaining portion, whereby the membrane-electrode assembly is easily repaired through replacement of a degraded module, and therefore time and expenses for maintenance of the membrane-electrode assembly are reduced.

Another aspect of the present disclosure is to provide a method of manufacturing a membrane-electrode assembly configured such that an electrode is modularized into a portion vulnerable to degradation and the remaining portion, whereby the membrane-electrode assembly is easily repaired through replacement of a degraded module, and therefore time and expenses for maintenance of the membrane-electrode assembly are reduced.

In addition to the above objects, other features and advantages of the present disclosure will be described hereinafter, or will be clearly understood by those skilled in the art to which the present disclosure pertains from the following description thereof.

Technical Solution

In accordance with the aspect of the present disclosure, there is provided a membrane-electrode assembly including a first electrode, a second electrode, and an electrolyte membrane between the first and second electrodes, wherein the first electrode includes first and second electrode modules separable from each other.

The first and second electrode modules may be in contact with each other, and a visual boundary resulting from at least one selected from the group consisting of a groove between the first and second electrode modules, a difference in color between the first and second electrode modules, and a difference in structure between the first and second electrode modules may be present between the first and second electrode modules.

The first and second electrode modules may be spaced apart from each other, and a visual boundary resulting from an interval between the first and second electrode modules may be present between the first and second electrode modules.

The membrane-electrode assembly may further include a first gas diffusion layer, wherein the first gas diffusion layer may be disposed such that the first electrode is located between the first gas diffusion layer and the electrolyte membrane, the first gas diffusion layer may include a first gas diffusion module attached to the first electrode module and a second gas diffusion module attached to the second electrode module, and the first and second gas diffusion modules may be separable from each other.

Alternatively, the membrane-electrode assembly may further include a first gas diffusion layer, wherein the first gas diffusion layer may be disposed such that the first electrode is located between the first gas diffusion layer and the electrolyte membrane, and the membrane-electrode assembly may further include an adhesive layer between one of the first and second electrode modules and the first gas diffusion layer.

The electrolyte membrane may include first and second membrane modules separable from each other, the second electrode may include third and fourth electrode modules separable from each other, the membrane-electrode assembly may include first and second assembly modules separable from each other, the first assembly module may include the first electrode module, the third electrode module, and the first membrane module between the first and third electrode modules, and the second assembly module may include the second electrode module, the fourth electrode module, and the second membrane module between the second and fourth electrode modules.

The first membrane module may have an active region in contact with the first and third electrode modules and a non-active region surrounding the active region, the second membrane module may have an active region in contact with the second and fourth electrode modules and a non-active region surrounding the active region, the first assembly module may further include first and third sub-gasket modules disposed in the non-active region of the first membrane module, the first and third sub-gasket modules surrounding the first and third electrode modules, respectively, and the second assembly module may further include second and fourth sub-gasket modules disposed in the non-active region of the second membrane module, the second and fourth sub-gasket modules surrounding the second and fourth electrode modules, respectively.

The first assembly module may include a first gas diffusion module covering the first electrode module and a third gas diffusion module covering the third electrode module, the first electrode module being disposed between the first membrane module and the first gas diffusion module, the third electrode module being disposed between the first membrane module and the third gas diffusion module, and the second assembly module may include a second gas diffusion module covering the second electrode module and a fourth gas diffusion module covering the fourth electrode module, the second electrode module being disposed between the second membrane module and the second gas diffusion module, the fourth electrode module being disposed between the second membrane module and the fourth gas diffusion module.

The membrane-electrode assembly may further include a first elastic gasket having first and second windows configured respectively to allow the first gas diffusion module and the second gas diffusion module to be exposed therethrough, the first elastic gasket being in contact with the first and second sub-gasket modules, and a second elastic gasket having third and fourth windows configured respectively to allow the third gas diffusion module and the fourth gas diffusion module to be exposed therethrough, the second elastic gasket being in contact with the third and fourth sub-gasket modules.

The first elastic gasket may include a first boundary region between the first and second windows, the first boundary region being in contact with both the first and second sub-gasket modules so as to prevent leakage of gas through a gap between the first and second assembly modules, the second elastic gasket may include a second boundary region between the third and fourth windows, the second boundary region being in contact with both the third and fourth sub-gasket modules so as to prevent leakage of gas through the gap between the first and second assembly modules, the first boundary region may have a plurality of first grooves configured to allow the first and second windows to fluidly communicate with each other therethrough on a surface thereof opposite the surface that contacts the first and second sub-gasket modules, and the second boundary region may have a plurality of second grooves configured to allow the third and fourth windows to fluidly communicate with each other therethrough on a surface thereof opposite the surface that contacts the third and fourth sub-gasket modules.

Alternatively, the first elastic gasket may include a first boundary region between the first and second windows, the first boundary region being in contact with both the first and second sub-gasket modules so as to prevent leakage of gas through the gap between the first and second assembly modules, the second elastic gasket may include a second boundary region between the third and fourth windows, the second boundary region being in contact with both the third and fourth sub-gasket modules so as to prevent leakage of gas through the gap between the first and second assembly modules, the first boundary region may include a first nonporous elastic layer in contact with the first and second sub-gasket modules and a first porous elastic layer on the first nonporous elastic layer, and the second boundary region may include a second nonporous elastic layer in contact with the third and fourth sub-gasket modules and a second porous elastic layer on the second nonporous elastic layer.

In accordance with the another aspect of the present disclosure, there is provided a method of manufacturing a membrane-electrode assembly, the method including forming a first electrode on a first surface of an electrolyte membrane and forming a second electrode on a second surface of the electrolyte membrane, the second surface being opposite the first surface, wherein the first electrode includes first and second electrode modules separable from each other.

The method may further include forming a first gas diffusion layer on the first electrode.

The forming the first gas diffusion layer may include forming a first gas diffusion module on the first electrode module and forming a second gas diffusion module on the second electrode module, and the first and second gas diffusion modules may be formed in such a way that the first and second gas diffusion modules are separable from each other.

The method may further include applying an adhesive to only one of the first and second electrode modules immediately before forming the first gas diffusion layer.

The electrolyte membrane may include first and second membrane modules separable from each other, the second electrode may include third and fourth electrode modules separable from each other, the forming the first electrode may include forming the first electrode module on the first surface of the first membrane module and forming the second electrode module on the first surface of the second membrane module, the forming the second electrode may include forming the third electrode module on the second surface of the first membrane module and forming the fourth electrode module on the second surface of the second membrane module, and the method may further include arranging a first assembly module including the first electrode module, the third electrode module, and the first membrane module between the first and third electrode modules and a second assembly module including the second electrode module, the fourth electrode module, and the second membrane module between the second and fourth electrode modules in such a way that the first and second assembly modules are adjacent to each other.

The first membrane module may have an active region in contact with the first and third electrode modules and a non-active region surrounding the active region, the second membrane module may have an active region in contact with the second and fourth electrode modules and a non-active region surrounding the active region, and the method may further include, before the arranging, forming first and third sub-gasket modules respectively surrounding the first and third electrode modules in the non-active region of the first membrane module in order to obtain the first assembly module and forming second and fourth sub-gasket modules respectively surrounding the second and fourth electrode modules in the non-active region of the second membrane module in order to obtain the second assembly module.

The method may further include, before the arranging, forming a first gas diffusion module on the first electrode module and a third gas diffusion module on the third electrode module in order to obtain the first assembly module and forming a second gas diffusion module on the second electrode module and a fourth gas diffusion module on the fourth electrode module in order to obtain the second assembly module.

The method may further include, after the arranging, forming a first elastic gasket having first and second windows configured respectively to allow the first gas diffusion module and the second gas diffusion module to be exposed therethrough on the first and second sub-gasket modules and forming a second elastic gasket having third and fourth windows configured respectively to allow the third gas diffusion module and the fourth gas diffusion module to be exposed therethrough on the third and fourth sub-gasket modules.

The first elastic gasket may include a first boundary region between the first and second windows, the first boundary region being in contact with both the first and second sub-gasket modules so as to prevent leakage of gas through a gap between the first and second assembly modules, the second elastic gasket may include a second boundary region between the third and fourth windows, the second boundary region being in contact with both the third and fourth sub-gasket modules so as to prevent leakage of gas through the gap between the first and second assembly modules, the first boundary region may have (i) a flow path structure having a plurality of first grooves configured to allow the first and second windows to fluidly communicate with each other therethrough on a surface thereof opposite the surface that contacts the first and second sub-gasket modules or (ii) a double layer structure including a first nonporous elastic layer in contact with the first and second sub-gasket modules and a first porous elastic layer on the first nonporous elastic layer, and the second boundary region may have (i) a flow path structure having a plurality of second grooves configured to allow the third and fourth windows to fluidly communicate with each other therethrough on a surface thereof opposite the surface that contacts the third and fourth sub-gasket modules or (ii) a double layer structure including a second nonporous elastic layer in contact with the third and fourth sub-gasket modules and a second porous elastic layer on the second nonporous elastic layer.

The general description of the present disclosure given above is provided merely to illustrate or describe the present disclosure, and does not limit the scope of rights of the present disclosure.

Advantageous Effects

According to the present disclosure, an electrode of a membrane-electrode assembly is modularized into a portion vulnerable to degradation and the remaining portion. When the portion vulnerable to degradation is degraded earlier than the remaining portion due to long-term operation of a fuel cell, therefore, it is possible to replace only the degraded portion (i.e., the degraded module) with a new module without needing to discard or replace the entirety of the electrode (or the entirety of the membrane-electrode assembly). According to the present disclosure, therefore, time and expenses for maintenance of the membrane-electrode assembly may be considerably reduced, and the lifespan of the membrane-electrode assembly may be increased.

In addition, according to the present disclosure, since only the degraded module may be replaced and the remaining portion of the electrode (i.e., the non-degraded module) may be continuously used, waste of resources may be minimized.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

MODE FOR INVENTION

Hereinafter, embodiments of the present disclosure will be described in detail with reference to the accompanying drawings. However, the following embodiments are illustratively provided merely for clear understanding of the present disclosure and do not limit the scope of the present disclosure.

Figure 1A:
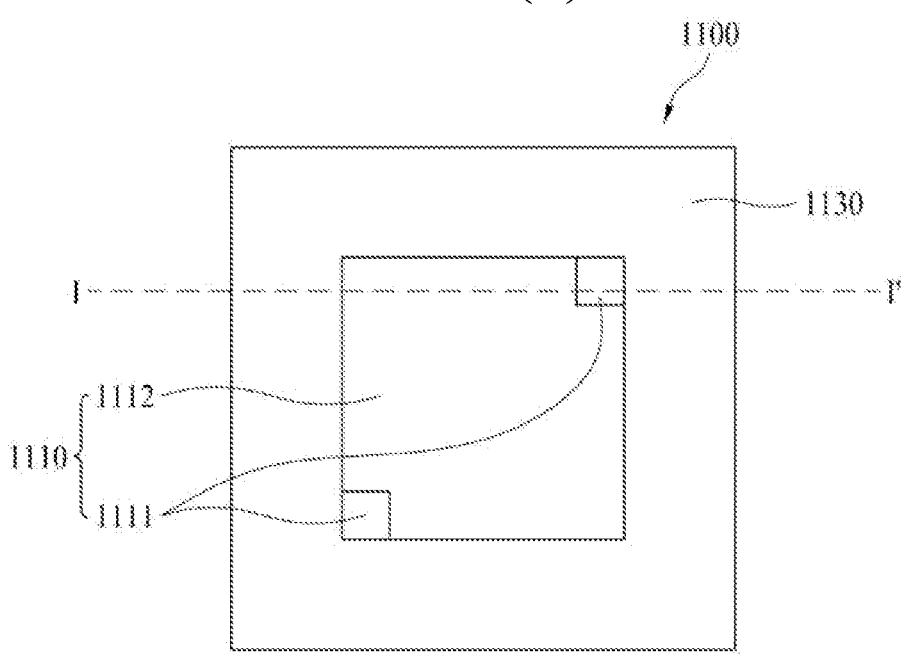
FIGS. 1(a) and 1(b) are respectively a plan view and a sectional view of a membrane-electrode assembly according to an embodiment of the present disclosure.
Figure 1B:
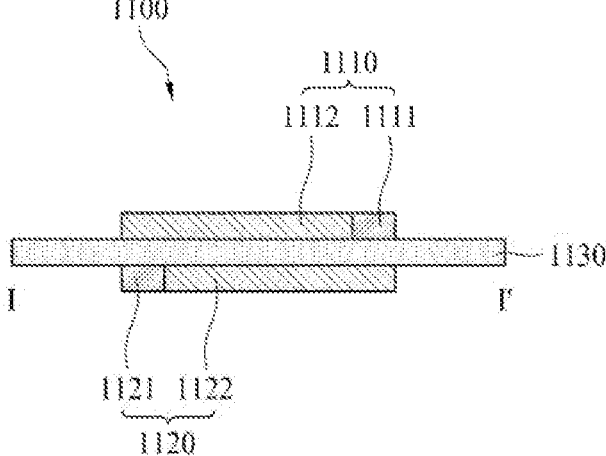

FIGS. 1(a) and 1(b) are respectively a plan view and a sectional view of a membrane-electrode assembly 1100 according to an embodiment of the present disclosure.

As illustrated in FIG. 1, the membrane-electrode assembly 1100 according to the present disclosure includes a first electrode 1110, a second electrode 1120, and an electrolyte membrane 1130 between the first and second electrodes 1110 and 1120.

The electrolyte membrane 1130 may be (i) a single membrane type polymer electrolyte membrane formed of an ionomer or (ii) a reinforced composite membrane type polymer electrolyte membrane including a porous support impregnated with an ionomer.

In both types of electrolyte membranes 1130, the ionomer may be a fluorine-based ionomer or a hydrocarbon-based ionomer, and may have at least one ion exchange group selected from the group consisting of a sulfonic acid group, a carboxyl group, a boronic acid group, a phosphate group, an imide group, a sulfonimide group, a sulfonamide group, and a sulfonic acid fluoride group.

For example, the ionomer may be a fluorine-based ionomer, such as poly(perfluorosulfonic acid), poly(perfluorocarboxylic acid), and so on.

Alternatively, the ionomer may be a hydrocarbon-based ionomer, such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and so on.

The porous support that may be used in the reinforced composite membrane type electrolyte membrane 1130 may be formed of polytetrafluoroethylene (PTFE), or may be formed of a copolymer of tetrafluoroethylene and $CF_2=CFC_nF_{2n+1}$ (n is a real number of 1 to 5) or $CF_2=CFO-(CF_2CF(CF_3)O)_mC_nF_{2n+1}$ (m is a real number of 0 to 15, and n is a real number of 1 to 15). For example, PTFE may be extruded into a tape shape under the presence of a lubricant and then an expansion process and a heat treatment process may be performed to form an expanded film type e-PTFE porous support. After the heat treatment process, an additional expansion process and an additional heat treatment process may be further performed. The expansion and heat treatment processes may be controlled to form various microstructured e-PTFE porous supports. For example, the e-PTFE porous support may have a microstructure in which nodes are connected to each other by fibrils or a microstructure constituted by only fibrils.

Alternatively, the porous support may be a nonwoven web. The nonwoven web may be formed of a support-forming solution including at least one hydrocarbon-based polymer selected from the group consisting of polyolefin (e.g., polyethylene, polypropylene, polybutylene, etc.), polyester (e.g., PET, PBT, etc.), polyamide (e.g., nylon-6, nylon-6,6, aramid, etc.), polyamic acid (molded into a web and then transformed into polyimide through an imidation process), polyurethane, polybutene, polylactic acid, polyvinyl alcohol, polyphenylene sulfide (PPS), polysulfone, a fluid crystalline polymer, polyethylene-co-vinyl acetate, polyacrylonitrile, cyclic polyolefin, polyoxymethylene, and a polyolefin-based thermoplastic elastomer.

The nonwoven web may be manufactured using a method selected from the group consisting of wet-laying, electrospinning, carding, garneting, air-laying, melt blowing, spun bonding, and stitch bonding.

The first and second electrodes 1110 and 1120 may be formed respectively on a first surface and a second surface, which is opposite the first surface, of the electrolyte membrane 1130 by decal transfer or direct coating using a catalyst slurry including a catalyst, an ionomer, and a dispersion medium.

In order to increase the active surface area of the catalyst, a catalyst having metal particles dispersed on an electrically conductive support is generally used.

The support may be (i) a carbon-based support, (ii) a conductive inorganic oxide support, such as titania, zirconia, alumina, silica, or ceria, or (iii) a zeolite support.

The carbon-based support may be a crystalline carbon-based support or an non-crystalline carbon-based support.

Specifically, the carbon-based support may be graphitized or non-graphitic carbon black, activated carbon, stabilized carbon, carbon sphere, carbon fiber, carbon sheet, carbon ribbon, fullerene, carbon nanotube (CNT), carbon nanofiber, carbon nanowire, carbon nanoball, carbon nanohorn, carbon nanocage, carbon nanoring, carbon aerogel, graphene, ordered porous carbon, mesoporous carbon, nanoporous carbon, or a combination of two or more thereof.

The term "graphitized or non-graphitic carbon black" used herein is a concept that encompasses all the graphitized or non-graphitic Ketjen black, graphitized or non-graphitic Denka black, and graphitized or non-graphitic acetylene black.

Graphitized carbon black, carbon nanotube, carbon nanofiber, etc. may be classified as a crystalline carbon-based support, and non-graphitic carbon black may be classified as a non-crystalline carbon-based support.

The metal particles may be platinum (Pt) particles or platinum-based alloy particles. The platinum-based alloy may be Pt—Co, Pt—Cr, Pt—Fe, Pt—Mn, Pt—Mo, Pt—Ni, Pt—Pd, Pt—Ru, Pt—Sn, Pt—W, Pt—Au—Co, Pt—Au—Fe, Pt—Au—Ni, Pt—Co—Fe, Pt—Co—Ir, Pt—Co—Mn, Pt—Co—Ni, Pt—Co—P, Pt—Co—S, Pt—Cr—Ir, Pt—Fe—Ir, Pt—Fe—P, Pt—Fe—S, Pt—Ni—Ir, Pt—Ru—Ir, Pt—Ru—Mo, Pt—Ru—Ni, Pt—Ru—W, Pt—Ru—Ir—Ni, Pt—Ru—Rh—Ni, or Pt—Ru—Sn—W.

The ionomer dispersed in the dispersion medium together with the catalyst is provided to transfer hydrogen ions, and also performs the function of a binder that increases the adhesive strength between the first and second electrodes 1110 and 1120 and the electrolyte membrane 1130.

The above-mentioned ionomers that may be used to form the electrolyte membrane 1130 may also be used to form the first and second electrodes 1110 and 1120. It is preferable for the ionomer of the electrolyte membrane 1130 and the ionomer of the first and second electrodes 1110 and 1120 to be of the same kind. However, the present disclosure is not limited thereto. Different kinds of ionomers may be used to manufacture the electrolyte membrane 1130 and the first and second electrodes 1110 and 1120.

The dispersion medium of the catalyst slurry may be ethanol, distilled water, isopropyl alcohol, normal propyl alcohol, butanol, or a mixture of two or more thereof. However, the present disclosure is not limited thereto.

In the present disclosure, as illustrated in FIG. 1, the first electrode 1110 includes first and second electrode modules 1111 and 1112 separable from each other.

That is, a method of manufacturing a membrane-electrode assembly 1100 according to the present disclosure includes a step of forming a first electrode 1110 on a first surface of an electrolyte membrane 1130 including first and second regions adjacent to each other and a step of forming a second electrode 1120 on a second surface of the electrolyte membrane 1130. In addition, the step of forming the first electrode 1110 includes a step of forming first electrode module(s) 1111 on the first region(s) and a step of forming a second electrode module 1112 on the second region. The first and second electrode modules 1111 and 1112 are formed in such a way that they are separable from each other.

The term "separable from each other" used in the present specification is a concept that encompasses (i) the meaning that two things in contact with each other may be separated from each other and (ii) the meaning that two things arranged in a state of being spaced apart from each other by a predetermined interval may be farther away from each other.

The first and second electrode modules 1111 and 1112 may be arranged side by side in a direction parallel to the surfaces of the electrolyte membrane 1130.

As previously described, degradation of the first electrode 1110 due to long-term operation of a fuel cell mainly occurs at specific portion(s) of the first electrode 1110, e.g., portion(s) of the first electrode corresponding to a gas inlet and/or a gas outlet, which are portion(s) vulnerable to degradation, rather than over the entire region of the first electrode.

In the present disclosure, the first electrode 1110 of the membrane-electrode assembly 1100 is modularized into first electrode module(s) 1111 corresponding to the portion(s) vulnerable to degradation and a second electrode module 1112 corresponding to the remaining portion. When the first electrode module(s) 1111 is degraded earlier than the second electrode module 1112 due to long-term operation of the fuel cell, therefore, it is possible to replace only the degraded first electrode module(s) 1111 with new electrode module(s) without needing to discard or replace the entirety of the first electrode 1110 or the entirety of the membrane-electrode assembly 1100. In the present disclosure, therefore, time and expenses for maintenance of the membrane-electrode assembly 1100 may be considerably reduced, and the lifespan of the membrane-electrode assembly 1100 may be increased. In addition, since only the degraded first electrode module(s) 1111 may be replaced and the remaining portion of the electrode 1110, i.e., the second electrode module 1112, may be continuously used, waste of resources can be minimized.

In an embodiment of the present disclosure, the first electrode module(s) 1111, which is a portion(s) vulnerable to degradation of the first electrode 1110, may occupy 50% or less of the entire active area of the first electrode 1110. However, the present disclosure is not limited thereto.

The first electrode 1110, which is modularized into the first and second electrode modules 1111 and 1112, may be an anode or a cathode.

Only one of the anode and the cathode of the membrane-electrode assembly 1100 may be modularized, or both the anode and the cathode may be modularized, as illustrated in FIG. 1. That is, in an embodiment of the present disclosure, not only the first electrode 1110 is modularized into the first and second electrode modules 1111 and 1112 but also the second electrode 1120 is modularized into third and fourth electrode modules 1121 and 1122 separable from each other, as illustrated in FIG. 1.

FIG. 1 shows an example in which the first electrode module(s) 1111, which is a portion(s) vulnerable to degradation of the first electrode 1110, and the third electrode module(s) 1121, which is a portion(s) vulnerable to degradation of the second electrode 1120, are arranged in a staggered manner. However, the present disclosure is not limited thereto. The first electrode module(s) 1111 and the third electrode module(s) 1121 may be arranged in an overlapping manner.

In the following, modularization of the first electrode 1110 will be mainly described. However, those skilled in the art will understand well that the same may also be applied to the second electrode 1120.

For convenience in replacement of the degraded first electrode module(s) 1111, a visible boundary may be present between the first and second electrode modules 1111 and 1112.

Figure 2:
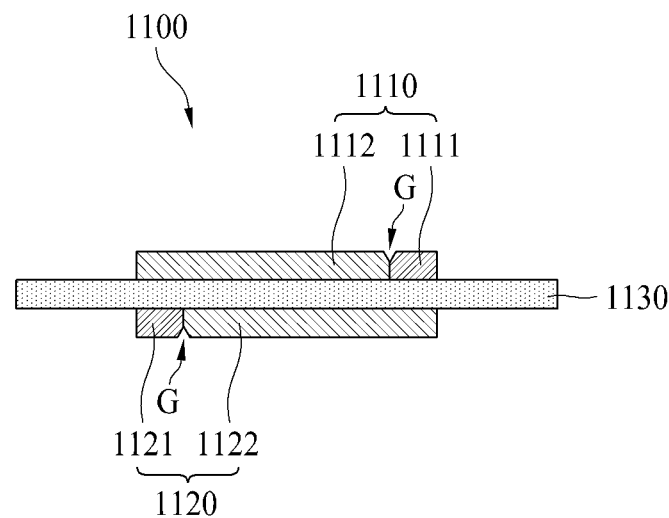
FIG. 2 is a sectional view of a membrane-electrode assembly according to an embodiment of the present disclosure.

In an embodiment of the present disclosure, as illustrated in FIG. 2, the first and second electrode modules 1111 and 1112 may be in contact with each other, and the visible boundary may result from a groove G between the first and second electrode modules 1111 and 1112. When the second electrode 1120 is also modularized into the third and fourth electrode modules 1121 and 1122 separable from each other, a visible boundary resulting from a groove G between the third and fourth electrode modules 1121 and 1122 may also be present therebetween.

Alternatively or additionally, the first and second electrode modules 1111 and 1112 may be in contact with each other, and the visible boundary between the first and second electrode modules 1111 and 1112 may result from a difference in color between the first and second electrode modules 1111 and 1112 due to a difference between materials constituting the first and second electrode modules 1111 and 1112. That is, the first electrode module 1111 may be formed of a first catalyst slurry, the second electrode module 1112 may be formed of a second catalyst slurry, and the first catalyst slurry may be different from the second catalyst slurry.

The reason that the first and second electrode modules 1111 and 1112 are formed of different catalyst slurries is that it is possible for the first electrode module(s) 1111, which are portion(s) vulnerable to degradation of the first electrode 1110, to be formed so as to have higher durability than the second electrode module 1112, whereby it is possible to improve overall durability of the membrane-electrode assembly 1100 without sacrificing the performance of the second electrode module 1112 or while minimizing a performance deterioration of the first electrode 1110.

For example, the first and second electrode modules 1111 and 1112 may include different catalysts in order to have different durabilities. That is, the first electrode module(s) 1111 may include a first catalyst having relatively low performance but relatively high durability, whereas the second electrode module 1112 may include a second catalyst having relatively low durability but relatively high performance.

The first catalyst may include a first support and first metal particles dispersed on the first support, the second catalyst may include a second support and second metal particles dispersed on the second support, the first and second supports may be different from each other and/or the first and second metal particles may be different from each other such that the first and second catalysts have different durabilities. For example, a crystalline carbon-based support (e.g., graphitized carbon black, carbon nanotube, carbon nanofiber, etc.) or a conductive inorganic oxide support (e.g., a support including $SnO_2$, $TiO_2$, or a mixture thereof) may be used as the first support, and a non-crystalline carbon-based support (e.g., non-graphitic carbon black) may be used as the second support, whereby the first catalyst may have better durability than the second catalyst. Consequently, the durability of the first electrode module(s) 1111 may be higher than that of the second electrode module 1112. In this case, the same kind of metal particles may be used as the first and second metal particles, or the first metal particles may have higher durability than the second metal particles.

When the first electrode 1110 is an anode, the first electrode module(s) 1111 may include an oxygen evolution reaction (OER) catalyst (hereinafter referred to as 'OER catalyst') and a first hydrogen oxidation reaction (HOR) catalyst (hereinafter referred to as 'first HOR catalyst'), and the second electrode module 1112 may include a second hydrogen oxidation reaction catalyst (hereinafter referred to as 'second HOR catalyst'), whereby the durability of the first electrode module(s) 1111 may be higher than that of the second electrode module 1112. The first and second HOR catalysts may be identical to or different from each other.

Each of the first and second HOR catalysts may include platinum (Pt) particles or platinum-based alloy particles (i.e., Pt—Co, Pt—Cr, Pt—Fe, Pt—Mn, Pt—Mo, Pt—Ni, Pt—Pd, Pt—Ru, Pt—Sn, Pt—W, Pt—Au—Co, Pt—Au—Fe, Pt—Au—Ni, Pt—Co—Fe, Pt—Co—Ir, Pt—Co—Mn, Pt—Co—Ni, Pt—Co—P, Pt—Co—S, Pt—Cr—Ir, Pt—Fe—Ir, Pt—Fe—P, Pt—Fe—S, Pt—Ni—Ir, Pt—Ru—Ir, Pt—Ru—Mo, Pt—Ru—Ni, Pt—Ru—W, Pt—Ru—Ir—Ni, Pt—Ru—Rh—Ni, or Pt—Ru—Sn—W).

In general, among the reactions occurring at an anode to which hydrogen gas is supplied are (i) hydrogen oxidation reaction performed by the HOR catalyst while hydrogen gas is normally supplied thereto and (ii) carbon oxidation reaction caused when the supply of hydrogen gas is reduced or interrupted due to lack of fuel. The carbon oxidation reaction leads to corrosion of the carbon-based support of the HOR catalyst, thereby causing elution and/or agglomeration of the metal particles of the HOR catalyst. The OER catalyst, which is a catalyst that induces oxygen evolution reaction to inhibit the carbon oxidation reaction, includes a support and metal particles dispersed thereon. The aforementioned carbon-based support, conductive inorganic oxide support, or zeolite support may be used as the support of the OER catalyst, and the metal particles of the OER catalyst may include $IrO_2$, $RuO_2$, $Ir_xSn_{1-x}O_2$ (x is a real number of greater than 0 and less than 1), PtIr, IrRu, PtRuIr, or a mixture of two or more thereof.

Alternatively or additionally, the first and second electrode modules 1111 and 1112 may include different ionomers in order to have different durabilities. That is, the first electrode module(s) 1111 may include a first ionomer having relatively high durability, whereas the second electrode module 1112 may include a second ionomer having relatively low durability. In general, the durability of an ionomer is closely related to the length of a side chain thereof. The shorter the length of the side chain is, the less the performance reduction rate in accelerated life evaluation of a fuel cell is. That is, it may be said that the shorter the length of the side chain of the ionomer is, the higher the durability thereof is.

When the second electrode 1120 is also modularized into electrode modules 1121 and 1122 separable from each other in addition to the first electrode 1110, the aforementioned visible boundary resulting from a difference in color/durability may also be present between the third and fourth electrode modules 1121 and 1122.

In another embodiment of the present disclosure, the first and second electrode modules 1111 and 1112 may be in contact with each other, and the visible boundary may result from a structural difference between the first and second electrode modules 1111 and 1112.

Figure 3:
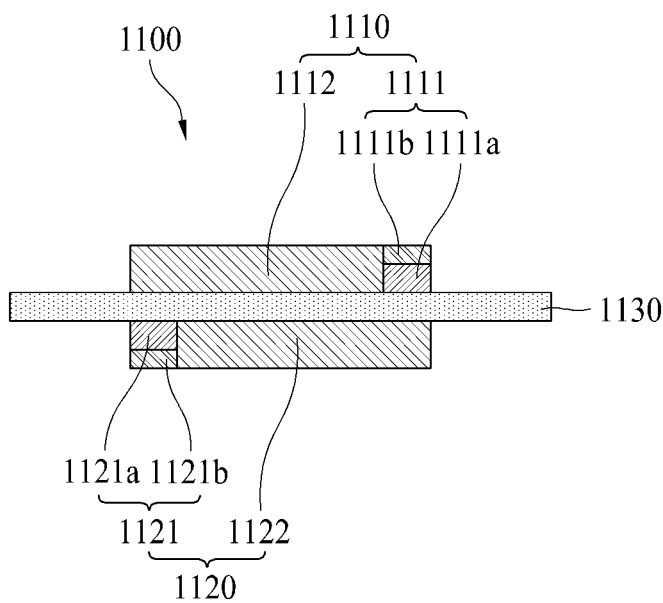
FIG. 3 is a sectional view of a membrane-electrode assembly according to another embodiment of the present disclosure.

For example, as shown in FIG. 3, the first electrode module(s) 1111 has a double layer structure including first and second sub-layers 1111a and 1111b sequentially formed on the electrolyte membrane 1130, and the second electrode module 1112 has a single layer structure.

When the second electrode 1120 is also modularized into electrode modules 1121 and 1122 separable from each other in addition to the first electrode 1110, the third electrode module(s) 1121 may have a double layer structure including third and fourth sub-layers 1121a and 1121b sequentially formed on the electrolyte membrane 1130, and the fourth electrode module 1122 may have a single layer structure.

One of the first and second sub-layers 1111a and 1111b may include a first catalyst, and the other of the first and second sub-layers 1111a and 111b and the second electrode module 1112 may include a second catalyst having lower durability than the first catalyst, such that the durability of the first electrode module(s) 1111 can be higher than the durability of the second electrode module 1112.

For example, as described above, a crystalline carbon-based support (e.g., graphitized carbon black, carbon nanotube, carbon nanofiber, etc.) or a conductive inorganic oxide support (e.g., a support including $SnO_2$, $TiO_2$, or a mixture thereof) may be used as the first support of the first catalyst, and a non-crystalline carbon-based support (e.g., non-graphitic carbon black) may be used as the second support of the second catalyst, such that the first catalyst can have better durability than the second catalyst.

Alternatively, when the first electrode 1110 is an anode at which hydrogen oxidation reaction occurs, the aforementioned OER catalyst may be used for the first catalyst, and the aforementioned HOR catalyst may be used for the second catalyst, such that the durability of the first electrode module 1111 can be higher than the durability of the second electrode module 1112. On the other hand, when the second electrode 1120 is an anode, one of the third and fourth sub-layers 1121a and 1121b may include an OER catalyst, and the other of the third and fourth sub-layers 1121a and 1121b and the fourth electrode module 1122 may include an HOR catalyst.

On the other hand, when the first electrode 1110 is a cathode at which oxygen reduction reaction occurs, the first electrode module(s) 1111 may have higher porosity than the second electrode module 1112, such that the water generated as the result of the oxygen reduction reaction can be more easily discharged from the first electrode module(s) 1111 than from the second electrode module 1112. Consequently, the first electrode module(s) 1111, from which the water that induces and/or accelerates electrode degradation is more easily discharged, has higher durability than the second electrode module 1112. In this case, a structural difference between the first and second electrode modules 1111 and 1112 that induces the visible boundary between the first and second electrode modules 1111 and 1112 in contact with each other is a difference in porosity. When the second electrode 1120 is a cathode, the same may also be applied to the second electrode 1120.

Figure 4:
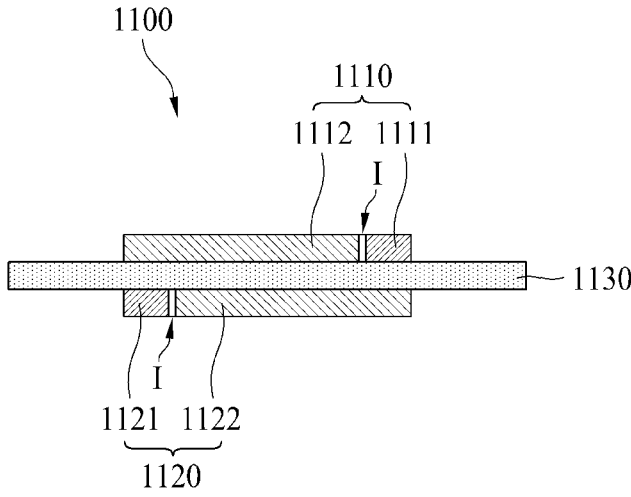
FIG. 4 is a sectional view of a membrane-electrode assembly according to yet another embodiment of the present disclosure.

Alternatively or additionally, as illustrated in FIG. 4, the first and second electrode modules 1111 and 1112 may be spaced apart from each other, and the visible boundary may result from an interval I between the first and second electrode modules 1111 and 1112. In the same manner, the third and fourth electrode modules 1121 and 1122 may also be spaced apart from each other, and the visible boundary may result from an interval I between the third and fourth electrode modules 1121 and 1122.

Hereinafter, a fuel cell 1000 including a membrane-electrode assembly 1100 according to the present disclosure will be described in detail with reference to FIGS. 5 to 7.

Figure 5:
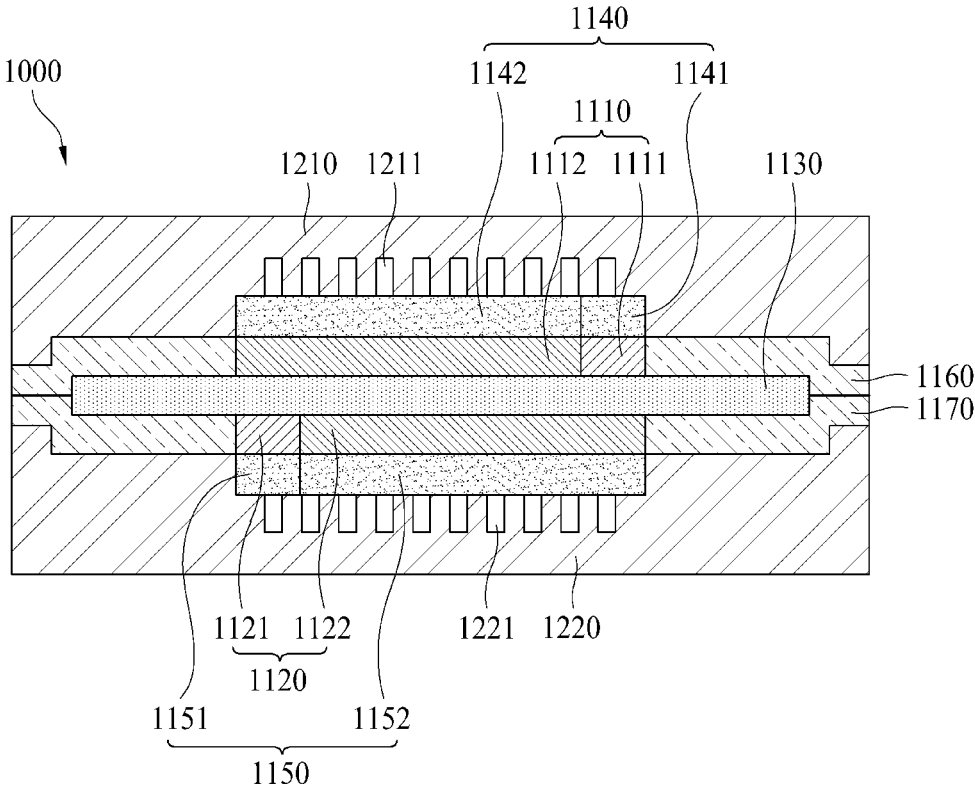
FIG. 5 is a sectional view of a fuel cell according to an embodiment of the present disclosure.
Figure 6:
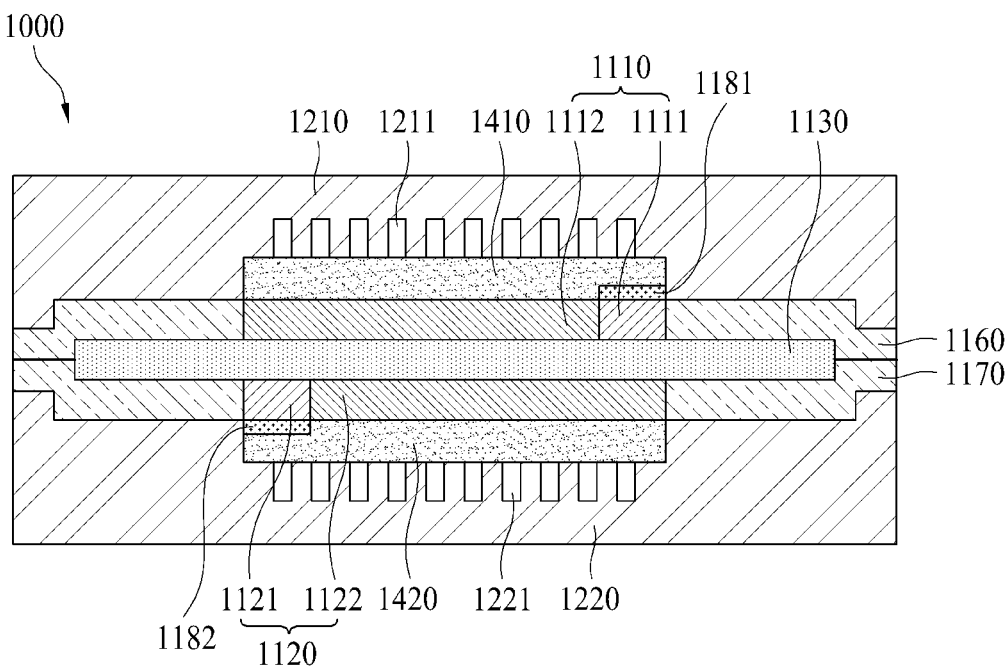
FIG. 6 is a sectional view of a fuel cell according to another embodiment of the present disclosure.
Figure 7:
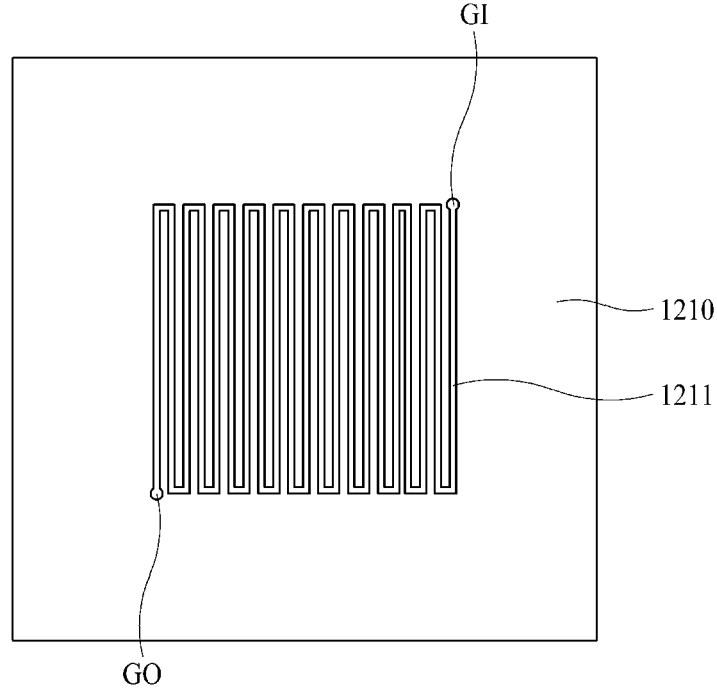
FIG. 7 shows a flow channel in a separator according to an embodiment of the present disclosure.

FIG. 5 is a sectional view of a fuel cell 1000 according to an embodiment of the present disclosure, FIG. 6 is a sectional view of a fuel cell 1000 according to another embodiment of the present disclosure, and FIG. 7 shows a flow channel 1211 in a separator 1210 according to an embodiment of the present disclosure.

As illustrated in FIG. 5, the fuel cell 1000 according to the present disclosure includes a first separator 1210, a second separator 1220, and a membrane-electrode assembly 1100 between the first and second separators 1210 and 1220.

The first electrode 1110 of the membrane-electrode assembly 1100 is disposed between the first separator 1210 and the electrolyte membrane 1130, and the second electrode 1120 of the membrane-electrode assembly 1100 is disposed between the second separator 1220 and the electrolyte membrane 1130.

As illustrated in FIG. 7, the first separator 1210 includes a first inlet GI for a first gas to be supplied to the first electrode 1110, a first outlet GO for the first gas, and a first flow channel 1211 between the first inlet GI and the first outlet GO.

In an embodiment of the present disclosure, the first electrode 1110 includes first and second electrode modules 1111 and 1112 separable from each other, and the first electrode module(s) 1111 is a portion(s) vulnerable to degradation corresponding to the first inlet GI and/or the first outlet GO.

Similarly, the second separator 1220 also includes a second inlet (not shown) for a second gas to be supplied to the second electrode 1120, a second outlet (not shown) for the second gas, and a second flow channel 1221 between the second inlet and the second outlet. In addition, the second electrode 1120 may also include third and fourth electrode modules 1121 and 1122 separable from each other, and the third electrode module(s) 1121 may be a portion(s) vulnerable to degradation corresponding to the second inlet (not shown) and/or the second outlet (not shown) of the second separator 1220.

It is possible to selectively replace only the electrode module(s) degraded due to long-term operation of the fuel cell 1000 by virtue of modularization of the first electrode 1110 and/or the second electrode 1120. As a result, time and expenses for maintenance of the fuel cell 1000 may be reduced, and the lifespan thereof may be increased.

As illustrated in FIG. 5, the first and second electrodes 1110 and 1120 are aligned with each other with the electrolyte membrane 1130 interposed therebetween, and the electrolyte membrane 1130 has an active region that transfers hydrogen ions between the first and second electrodes 1110 and 1120 and a non-active region that surrounds the active region. That is, the first electrode 1110 is disposed on a first surface of the active region of the electrolyte membrane 1130, and the second electrode 1120 is disposed on a second surface of the active region of the electrolyte membrane 1130.

As illustrated in FIG. 5, the fuel cell 1000 according to the present disclosure may include a first sub-gasket 1160 disposed on a first surface of the non-active region of the electrolyte membrane 1130 and a second sub-gasket 1170 disposed on a second surface of the non-active region of the electrolyte membrane 1130.

The first and second sub-gaskets 1160 and 1170 (i) prevent damage of an edge portion of the electrolyte membrane 1130 due to the repeated swelling and contraction thereof during the operation of the fuel cell 1000, (ii) cure the problem of poor handling of the membrane-electrode assembly 1100 due to extreme thinness of the electrolyte membrane 1130, and (iii) prevent leakage of gas (i.e., hydrogen gas and/or air).

Each of the first and second sub-gaskets 1160 and 1170 has an electrode window, through which a corresponding one of the first and second electrodes 1110 and 1120 is exposed. That is, the first sub-gasket 1160 surrounds the first electrode 1110, and the second sub-gasket 1170 surrounds the second electrode 1120.

Each of the first and second sub-gaskets 1160 and 1170 may be formed by laminating, on the electrolyte membrane 1130, a film that has good chemical resistance and heat resistance within a temperature range from room temperature to 120° C., is able to withstand a pressure of 100 torque or more, and has a relatively low gas permeability. For example, each of the first and second sub-gaskets 1160 and 1170 may include a polyimide (PI)-based compound, a polyethylene (PE)-based compound, a polypropylene (PP)-based compound, a polyethylene terephthalate (PET)-based compound, a fluorinated ethylene propylene (FEP)-based compound, a polyethylene naphthalate (PEN)-based compound, or a mixture of two or more thereof.

A structure including an electrolyte membrane 1130, first and second electrodes 1110 and 1120, and first and second sub-gaskets 1160 and 1170 is also be referred to as a membrane-electrode assembly, and a roll-to-roll continuous process may be adopted in order to improve productivity of such a membrane-electrode assembly. For example, the roll-to-roll continuous process may include (i) a first step of continuously forming first electrodes 1110 and second electrodes 1120 at predetermined intervals on first and second surfaces of an electrolyte membrane 1130 provided in a continuous film form so as to obtain a catalyst coated membrane (CCM), (ii) a second step of laminating first and second sub-gasket films having electrode windows formed at predetermined intervals respectively on opposite surfaces of the CCM that is continuously provided, and (iii) a step of cutting the stack thus obtained to form individual membrane-electrode assemblies.

Alternatively, a step of laminating first and second sub-gasket films respectively on the first and second surfaces of the electrolyte membrane 1130 provided in a continuous film form may be performed first, and then first electrodes 1110 and second electrodes 1120 may be formed respectively on the portions of the electrolyte membrane 1130 exposed through the windows of the first and second sub-gasket films.

As illustrated in FIG. 5, the fuel cell 1000 according to an embodiment of the present disclosure may further include a first gas diffusion layer 1140 between the first electrode 1110 and the first separator 1210 and a second gas diffusion layer 1150 between the second electrode 1120 and the second separator 1220. That is, the method of the present disclosure for manufacturing the membrane-electrode assembly may further include a step of forming a first gas diffusion layer 1140 on the first electrode 1110 and a step of forming a second gas diffusion layer 1150 on the second electrode 1120.

The entirety of a structure including an electrolyte membrane 1130, first and second electrodes 1110 and 1120, first and second sub-gaskets 1160 and 1170, and first and second gas diffusion layers 1140 and 1150 is also be referred to as a membrane-electrode assembly. Consequently, the membrane-electrode assembly 1100 according to the present disclosure may further include the first and second gas diffusion layers 1140 and 1150. In this membrane-electrode assembly 1100, the first electrode 1110 is located between the first gas diffusion layer 1140 and the electrolyte membrane 1130, and the second electrode 1120 is located between the second gas diffusion layer 1150 and the electrolyte membrane 1130.

The first and second gas diffusion layers 1140 and 1150 have main functions of (i) providing gas diffusion paths from the flow channels 1211 and 1221 in the first and second separators 1210 and 1220 to the first and second electrodes 1110 and 1120 such that gas (i.e., hydrogen gas and/or air) is easily and uniformly supplied to the first and second electrodes 1110 and 1120, (ii) allowing water, which is a byproduct of oxidation-reduction reaction, to be easily removed from the first and second electrodes 1110 and 1120 therethrough, thereby preventing flooding, (iii) storing some water therein, thereby preventing an abrupt decrease of the moisture content of the electrolyte membrane 1130, and (iv) providing sufficient mechanical strength to the membrane-electrode assembly 1100.

Each of the first and second gas diffusion layers 1140 and 1150 may be an electrically conductive porous member, such as carbon paper, carbon cloth, carbon felt, carbon nonwoven fabric, metal paper, metal cloth, metal felt, metal nonwoven fabric, and so on.

In an embodiment of the present disclosure, as illustrated in FIG. 5, the first gas diffusion layer 1140 may include first gas diffusion module(s) 1141 attached to the first electrode module(s) 1111 and a second gas diffusion module 1142 attached to the second electrode module 1112, and the first and second gas diffusion modules 1141 and 1142 may be separable from each other. That is, the first gas diffusion layer 1140 may be formed by forming the first gas diffusion module(s) 1141 on the first electrode module 1111 and forming the second gas diffusion module 1142 on the second electrode module 1112, in such a way that the first and second gas diffusion modules 1141 and 1142 are separable from each other. The first and second gas diffusion modules 1141 and 1142 may be formed of the same material using the same method. However, the present disclosure is not limited thereto. The first and second gas diffusion modules may be formed of different materials using different methods. In this embodiment, the first electrode module 1111 and the first gas diffusion module 1141 may form a replacement unit, whereby convenience in replacement of the first electrode module 1111 may be improved.

For the same reason, as illustrated in FIG. 5, the second gas diffusion layer 1150 may also include third gas diffusion module(s) 1151 attached to the third electrode module(s) 1121 and a fourth gas diffusion module 1152 attached to the fourth electrode module 1122, and the third and fourth gas diffusion modules 1151 and 1152 may be separable from each other.

Alternatively, instead of modularizing the first gas diffusion layer 1140 into the first and second gas diffusion modules 1141 and 1142, the adhesive strength between the first gas diffusion layer 1140 and the first electrode module(s) 1111 and the adhesive strength between the first gas diffusion layer 1140 and the second electrode module 1112 may be set to be different from each other, such that it is possible to improve convenience in replacement of the first electrode module(s) 1111.

For example, as illustrated in FIG. 6, the membrane-electrode assembly 1100 may further include first adhesive layer(s) 1181 between the first electrode module(s) 1111 corresponding to the portion(s) vulnerable to degradation and the first gas diffusion layer 1140. That is, an adhesive may be applied only onto the first electrode module(s) 1111, and then the first gas diffusion layer 1140 may be formed over the entirety of the first electrode 1110. By virtue of the first adhesive layer(s) 1181, the adhesive strength between the first gas diffusion layer 1140 and the first electrode module(s) 1111 is higher than the adhesive strength between the first gas diffusion layer 1140 and the second electrode module 1112. In this case, the first electrode module(s) 1111 and the entirety of the first gas diffusion layer 1140 may form a replacement unit, whereby convenience in replacement of the first electrode module(s) 1111 may be improved.

For the same reason, as illustrated in FIG. 6, the membrane-electrode assembly 1100 may further include second adhesive layer(s) 1182 between the third electrode module(s) 1121 corresponding to the portion(s) vulnerable to degradation and the second gas diffusion layer 1150. That is, an adhesive may be applied only onto the third electrode module(s) 1121, and then the second gas diffusion layer 1150 may be formed over the entirety of the second electrode 1120.

Hereinafter, a membrane-electrode assembly according to another embodiment of the present disclosure and a method of manufacturing the same will be described in detail with reference to FIG. 8.

Figure 8A:
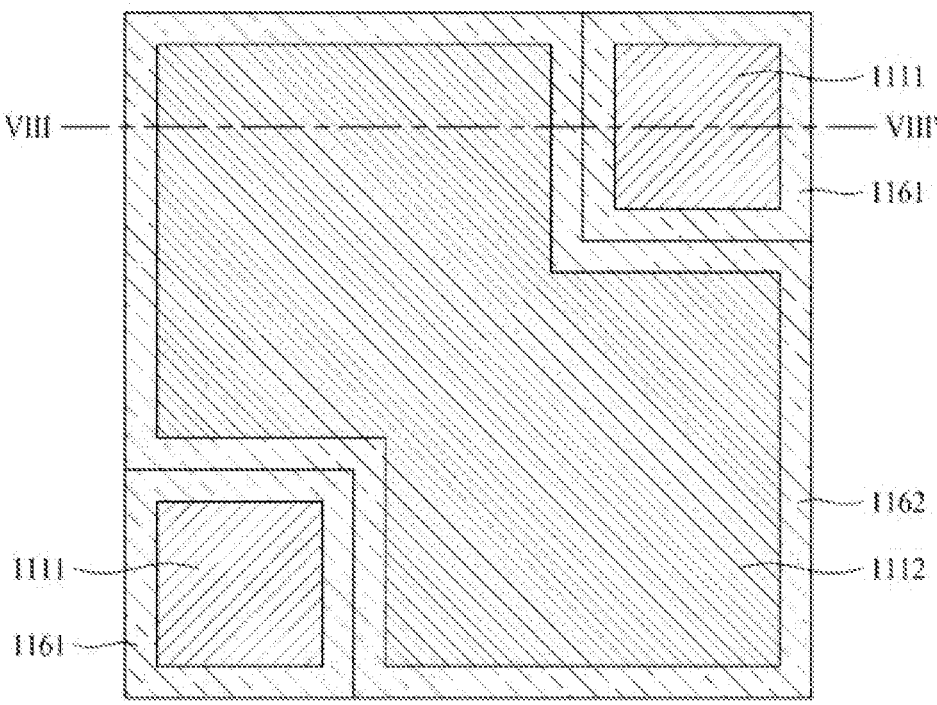
FIGS. 8(a) and 8(b) are respectively a plan view and a sectional view of a membrane-electrode assembly according to another embodiment of the present disclosure.
Figure 8B:
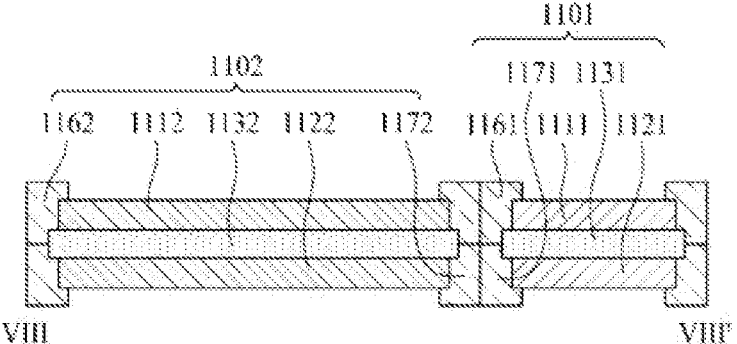

FIGS. 8(a) and 8(b) are respectively a plan view and a sectional view of a membrane-electrode assembly according to another embodiment of the present disclosure.

As illustrated in FIG. 8, in the membrane-electrode assembly according to another embodiment of the present disclosure, a first electrode includes first and second electrode modules 1111 and 1112 separable from each other, an electrolyte membrane includes first and second membrane modules 1131 and 1132 separable from each other, and a second electrode includes third and fourth electrode modules 1121 and 1122 separable from each other.

In the embodiment of FIG. 8, the first electrode module(s) 1111, which is a portion(s) vulnerable to degradation of the first electrode, and the third electrode module(s) 1121, which is a portion(s) vulnerable to degradation of the second electrode, are arranged in an overlapping manner, unlike the embodiments illustrated in FIGS. 1 to 6. Consequently, the first and third electrode modules 1111 and 1121 and the first membrane module 1131 therebetween constitute a first assembly module 1101, and the second and fourth electrode modules 1112 and 1122 and the second membrane module 1132 therebetween constitute a second assembly module 1102.

When the first and/or third electrode module(s) 1111 and/or 1121, the portion(s) vulnerable to degradation, are/is degraded earlier than the second and fourth electrode modules 1112 and 1122 due to long-term operation of the fuel cell, the first assembly module 1101 may be separated from the second assembly module 1102 and then replaced with a new module.

The first and second assembly modules 1101 and 1102 may be separately manufactured. In other words, a first electrode module 1111 may be formed on a first surface of a first membrane module 1131, and a third electrode module 1121 may be formed on a second surface of the first membrane module 1131, which is opposite the first surface, whereby the first assembly module 1101 may be obtained. In addition, a second electrode module 1112 may be formed on a first surface of a second membrane module 1132, and a fourth electrode module 1122 may be formed on a second surface of the second membrane module 1132, which is opposite the first surface, whereby the second assembly module 1102 may be obtained.

The material for each of the electrode modules 1111, 1112, 1121, and 1122 is the same as above. In addition, the membrane modules 1131 and 1132 may be manufactured using the aforementioned material for the electrolyte membrane 1130, and therefore a detailed description thereof will be omitted.

A membrane-electrode assembly may be manufactured by arranging the first and second assembly modules 1101 and 1102, separately obtained as described above, in such a way that they are adjacent to each other.

The first membrane module 1131 has an active region that contacts the first and third electrode modules 1111 and 1121 and a non-active region that surrounds the active region, and the second membrane module 1132 has an active region that contacts the second and fourth electrode modules 1112 and 1122 and a non-active region that surrounds the active region.

As illustrated in FIG. 8, the first assembly module 1101 may further include first and third sub-gasket modules 1161 and 1171 disposed in the non-active region of the first membrane module 1131 so as to surround the first and third electrode modules 1111 and 1121, respectively. Similarly, the second assembly module 1102 may further include second and fourth sub-gasket modules 1162 and 1172 disposed in the non-active region of the second membrane module 1132 so as to surround the second and fourth electrode modules 1112 and 1122, respectively.

Therefore, the method according to an embodiment of the present disclosure for manufacturing a membrane-electrode assembly may further include, before arranging the first and second assembly modules 1101 and 1102 in such a way that they are adjacent to each other, (i) a step of forming the first and third sub-gasket modules 1161 and 1171 that surround the first and third electrode modules 1111 and 1121, respectively, in the non-active region of the first membrane module 1131 in order to obtain the first assembly module 1101 and (ii) a step of forming the second and fourth sub-gasket modules 1162 and 1172 that surround the second and fourth electrode modules 1112 and 1122, respectively, in the non-active region of the second membrane module 1132 in order to obtain the second assembly module 1102.

The explanation provided above in connection with the sub-gaskets 1160 and 1170 will substitute for a description of the functions of and the materials for the sub-gasket modules 1161, 1162, 1171, and 1172.

Consequently, the embodiment of FIG. 8 is different from the embodiments illustrated in FIGS. 1 to 6 in that (i) the electrolyte membrane includes first and second membrane modules 1131 and 1132 separable from each other, (ii) the first and third electrode modules 1111 and 1121, which are portions vulnerable to degradation, are arranged in an overlapping manner, (iii) the first sub-gasket includes first and second sub-gasket modules 1161 and 1162 separable from each other, (iv) the second sub-gasket includes third and fourth sub-gasket modules 1171 and 1172 separable from each other, and (v) the first membrane module 1131, the first sub-gasket module 1161, and the third sub-gasket module

1171 may also be replaced when the first and third electrode modules 1111 and 1121 are replaced.

Figure 9:
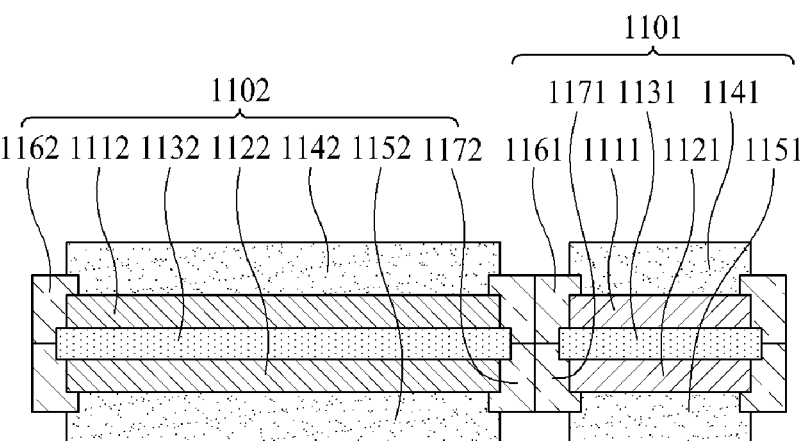
FIG. 9 is a sectional view of a membrane-electrode assembly according to another embodiment of the present disclosure.

FIG. 9 is a sectional view of a membrane-electrode assembly according to another embodiment of the present disclosure.

As illustrated in FIG. 9, the first assembly module 1101 may further include a first gas diffusion module 1141 that covers the first electrode module 1111 and a third gas diffusion module 1151 that covers the third electrode module 1121, and the second assembly module 1102 may further include a second gas diffusion module 1142 that covers the second electrode module 1112 and a fourth gas diffusion module 1152 that covers the fourth electrode module 1122.

The first electrode module 1111 is disposed between the first membrane module 1131 and the first gas diffusion module 1141, the third electrode module 1121 is disposed between the first membrane module 1131 and the third gas diffusion module 1151, the second electrode module 1112 is disposed between the second membrane module 1132 and the second gas diffusion module 1142, and the fourth electrode module 1122 is disposed between the second membrane module 1132 and the fourth gas diffusion module 1152.

Therefore, the method according to an embodiment of the present disclosure for manufacturing a membrane-electrode assembly may further include, before arranging the first and second assembly modules 1101 and 1102 in such a way that they are adjacent to each other, (i) a step of forming the first gas diffusion module 1141 on the first electrode module 1111 and the third gas diffusion module 1151 on the third electrode module 1121 in order to obtain the first assembly module 1101 and (ii) a step of forming the second gas diffusion module 1142 on the second electrode module 1112 and the fourth gas diffusion module 1152 on the fourth electrode module 1122 in order to obtain the second assembly module 1102.

The explanation provided above in connection with the gas diffusion layers 1140 and 1150 will substitute for a description of the functions of and the materials for the gas diffusion modules 1141, 1142, 1151, and 1152.

In the embodiment of FIG. 9, when the first and/or third electrode module(s) 1111 and/or 1121, the portion(s) vulnerable to degradation, are/is degraded earlier than the second and fourth electrode modules 1112 and 1122 due to long-term operation of the fuel cell, and thus the first assembly module 1101 is separated from the second assembly module 1102 and replaced with a new module, the first and third gas diffusion modules 1141 and 1151 may also be replaced.

Since, in the embodiments of FIGS. 8 and 9, the electrolyte membrane includes the first and second membrane modules 1131 and 1132 separable from each other, unlike the embodiments of FIGS. 1 to 6, there might be a risk of gas leakage/flow through a gap therebetween. Hereinafter, an example of a membrane-electrode assembly capable of overcoming such a risk will be described in detail with reference to FIGS. 10 and 11.

Figure 10A:
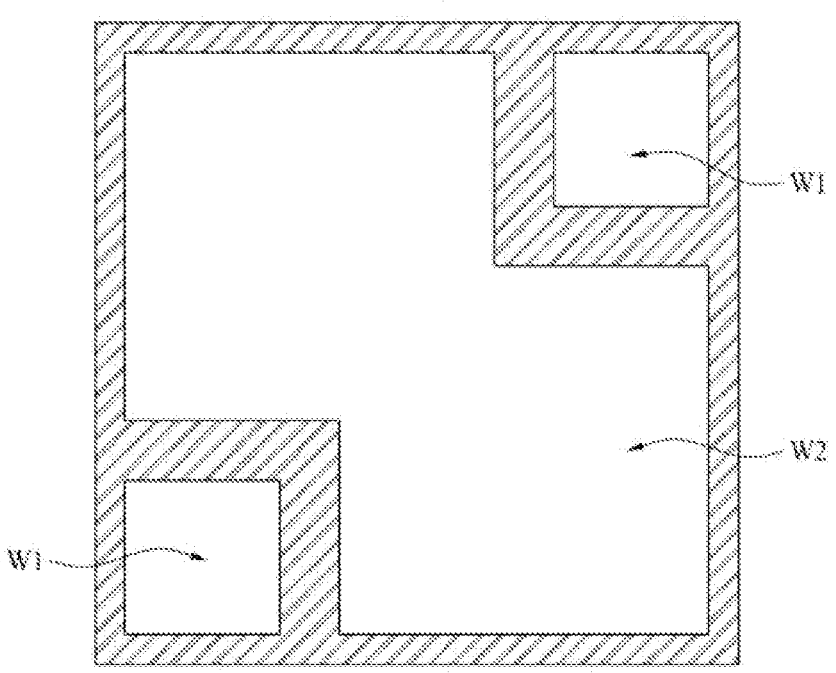
FIG. 10(a) is a plan view of an elastic gasket according to an embodiment of the present disclosure.
Figure 10B:
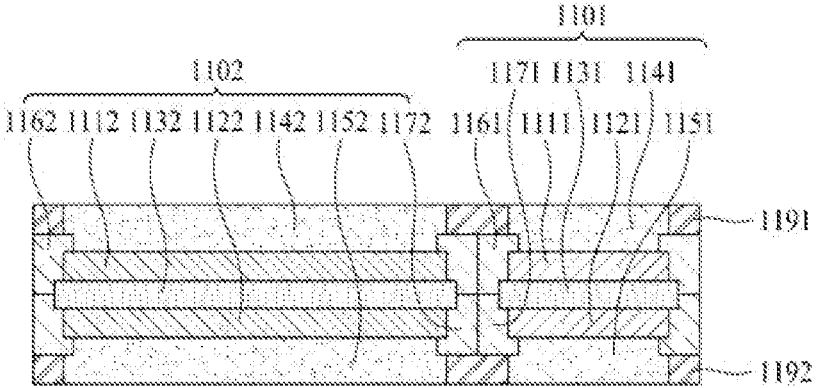
FIG. 10(b) is a sectional view of a membrane-electrode assembly having the elastic gasket of FIG. 10(a) applied thereto.
Figure 11:
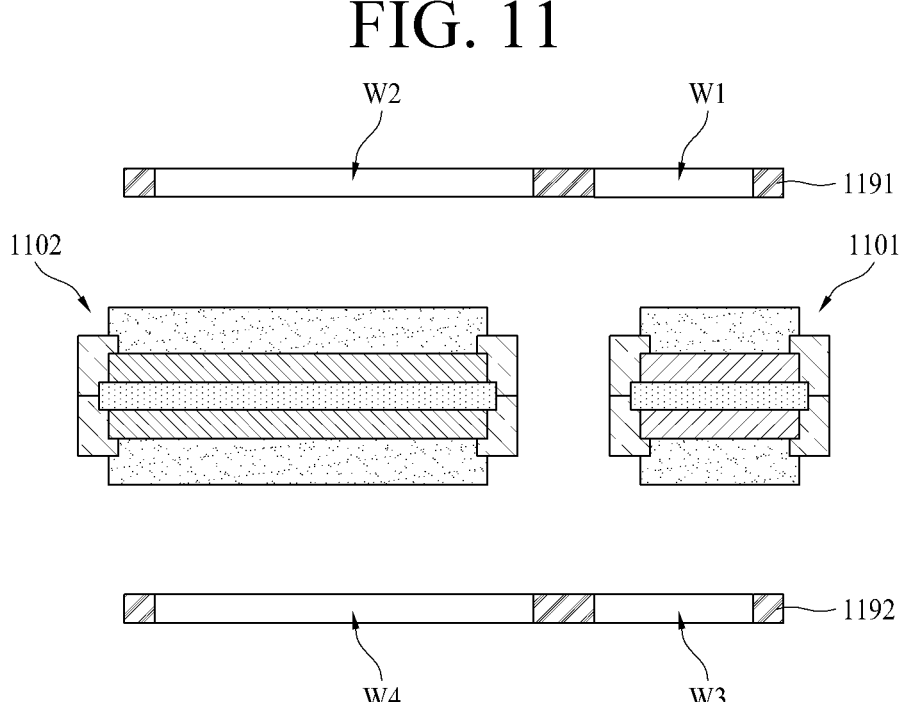
FIG. 11 is an exploded sectional view of the membrane-electrode assembly of FIG. 10(b)

FIG. 10(*a*) is a plan view of an elastic gasket according to an embodiment of the present disclosure, FIG. 10(*b*) is a sectional view of a membrane-electrode assembly having the elastic gasket of FIG. 10(*a*) applied thereto, and FIG. 11 is an exploded sectional view of the membrane-electrode assembly of FIG. 10(*b*).

As illustrated in FIGS. 10 and 11, a membrane-electrode assembly including first and second assembly modules 1101 and 1102 separable from each other further includes first and second elastic gaskets 1191 and 1192.

The first elastic gasket 1191 has first and second windows W1 and W2, through which the first gas diffusion modules 1141 and the second gas diffusion module 1142 are exposed, respectively, and contacts the first and second sub-gasket modules 1161 and 1162.

Similarly, the second elastic gasket 1192 has third and fourth windows W3 and W4, through which the third gas diffusion modules 1151 and the fourth gas diffusion module 1152 are exposed, respectively, and contacts the third and fourth sub-gasket modules 1171 and 1172.

Therefore, the method according to an embodiment of the present disclosure for manufacturing a membrane-electrode assembly may further include, after arranging the first and second assembly modules 1101 and 1102 in such a way that they are adjacent to each other, (i) a step of forming the first elastic gasket 1191 on the first and second sub-gasket modules 1161 and 1162 and (ii) a step of forming the second elastic gasket 1192 on the third and fourth sub-gasket modules 1171 and 1172.

Each of the first and second elastic gaskets 1191 and 1192 may be formed of an elastic material such as rubber (e.g., EPDM rubber), and thus can be tightly fitted between the first and second assembly modules 1101 and 1102, more specifically between the first and second gas diffusion modules 1141 and 1142 and between the third and fourth gas diffusion modules 1151 and 1152, such that it is possible to prevent leakage/flow of gas through a gap between the first and second assembly modules 1101 and 1102.

When the first and/or third electrode module(s) 1111 and/or 1121, the portion(s) vulnerable to degradation, are/is degraded earlier than the second and fourth electrode modules 1112 and 1122 due to long-term operation of the fuel cell, the first and second elastic gaskets 1191 and 1192 may be separated from the first and second assembly modules 1101 and 1102, respectively, and then the first assembly module 1101 may be separated from the second assembly module 1102 so as to be replaced with a new module (a first assembly module), as illustrated in FIG. 11.

Meanwhile, a possibility of turbulence which might be incurred when the in-plane flow of gas introduced into the first and second gas diffusion modules 1141 and 1142 through the flow channel in the separator (not shown) is disturbed by the first elastic gasket 1191 cannot be ignored. Likewise, there is also a possibility of turbulence which might be incurred when the in-plane flow of gas introduced into the third and fourth gas diffusion modules 1151 and 1152 is disturbed by the second elastic gasket 1192. Such turbulence incurs pressure loss which in turn causes performance deterioration of the fuel cell.

Hereinafter, examples of an elastic gasket capable of inhibiting the occurrence of such turbulence will be described in detail with reference to FIGS. 12 and 13.

Figure 12A:
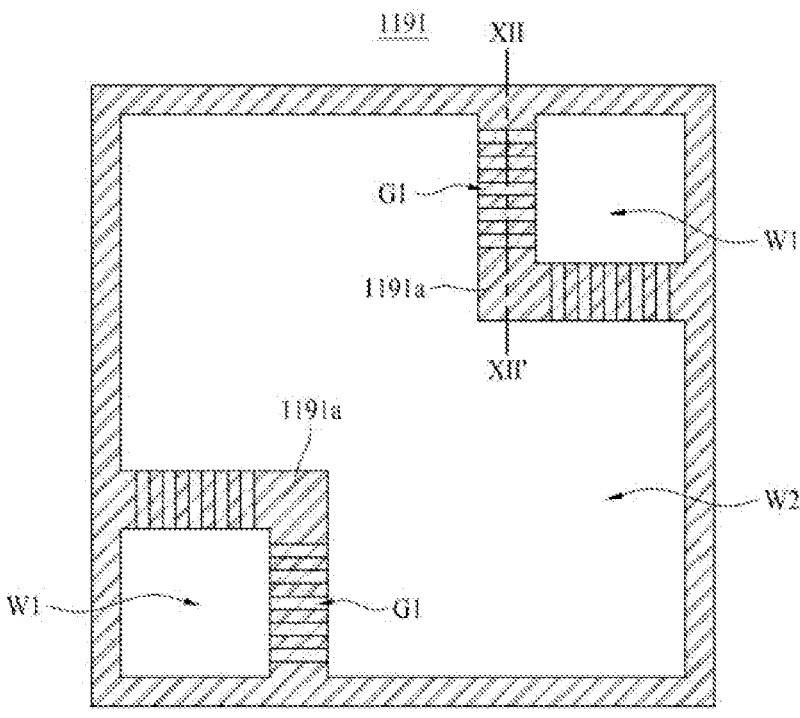
FIGS. 12(a) and 12(b) are respectively a plan view and a partial sectional view of an elastic gasket according to another embodiment of the present disclosure.
Figure 12B:
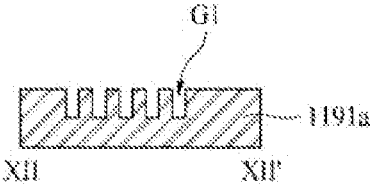
Figure 12C:
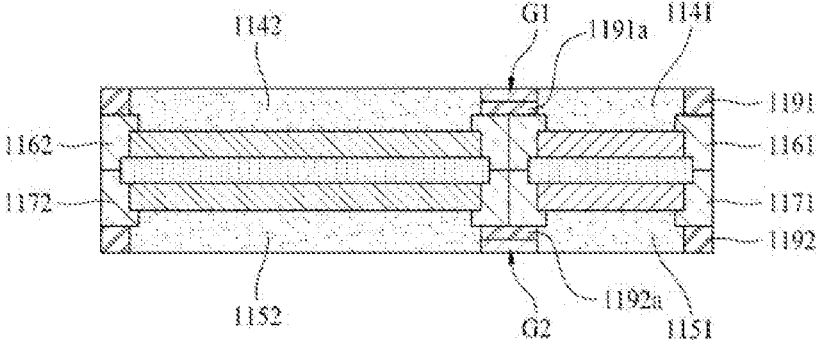
FIG. 12(c) is a sectional view of a membrane-electrode assembly having the elastic gasket of FIGS. 12(a) and 12(b) applied thereto.
Figure 13A:
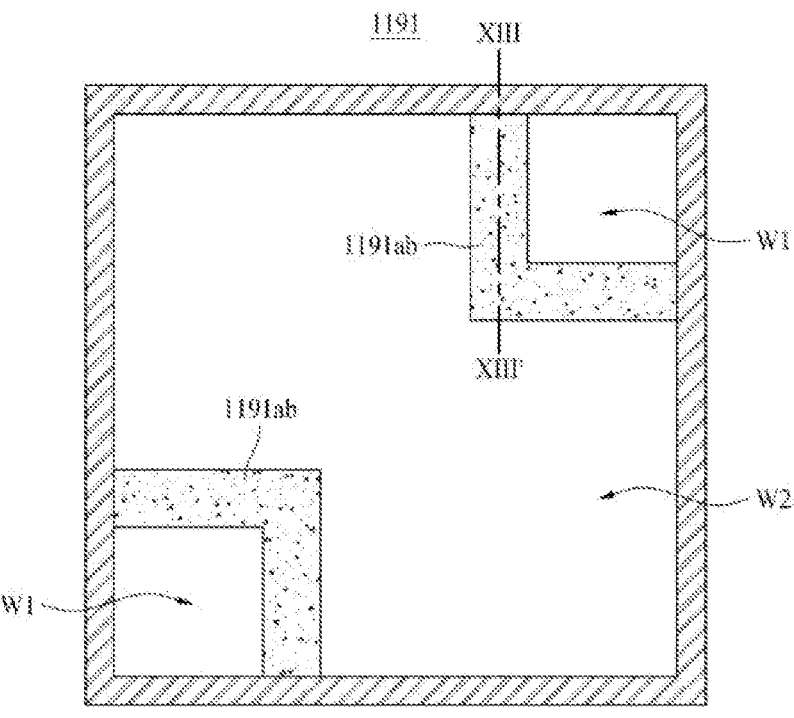
FIGS. 13(a) and 13(b) are respectively a plan view and a partial sectional view of an elastic gasket according to yet another embodiment of the present disclosure.
Figure 13B:
Figure 13C:
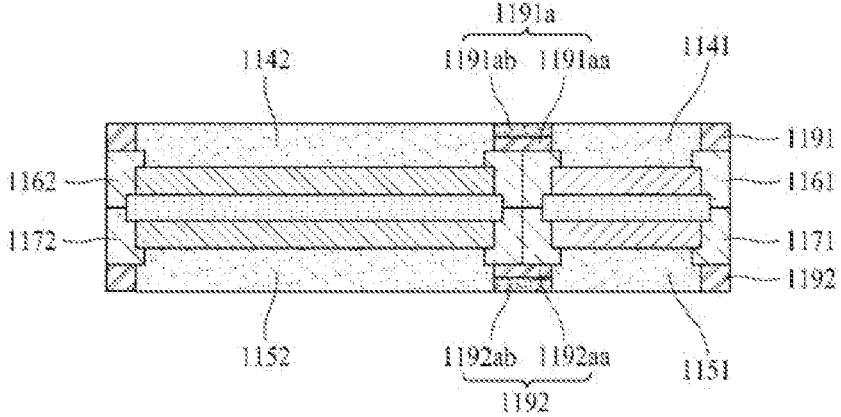
FIG. 13(c) is a sectional view of a membrane-electrode assembly having the elastic gasket of FIGS. 13(a) and 13(b) applied thereto.

As illustrated in FIGS. 12 and 13, the first elastic gasket 1191 includes a first boundary region 1191*a* between the first and second windows W1 and W2. The first boundary region 1191*a* contacts both the first and second sub-gasket modules 1161 and 1162 so as to prevent leakage of gas through a gap between the first and second assembly modules 1101 and 1102.

Similarly, the second elastic gasket 1192 includes a second boundary region 1192*a* between the third and fourth windows W3 and W4. The second boundary region 1192*a* contacts both the third and fourth sub-gasket modules 1171 and 1172 so as to prevent leakage of gas through the gap between the first and second assembly modules 1101 and 1102.

In an embodiment of the present disclosure illustrated in FIG. 12, the first boundary region 1191*a* may have a structure having a plurality of first grooves G1 that allows the first and second windows W1 and W2 to fluidly communicate with each other therethrough on a surface thereof which is opposite the surface that contacts the first and second sub-gasket modules 1161 and 1162, i.e., a flow path structure. Consequently, the portion of the first boundary region 1191*a* that contacts the first and second sub-gasket modules 1161 and 1162 may serve as a sealing member that prevents leakage/flow of gas through the gap between the first and second assembly modules 1101 and 1102, whereas the remaining portion of the first boundary region 1191*a* in which the first grooves G1 are formed may guarantee the in-plane flow of gas introduced into the first and second gas diffusion modules 1141 and 1142, thereby preventing turbulence.

Similarly, the second boundary region 1192*a* may have a flow path structure having a plurality of second grooves G2 that allows the third and fourth windows W3 and W4 to fluidly communicate with each other therethrough on a surface thereof which is opposite the surface that contacts the third and fourth sub-gasket modules 1171 and 1172. Consequently, the portion of the second boundary region 1192*a* that contacts the third and fourth sub-gasket modules 1171 and 1172 may serve as a sealing member that prevents leakage/flow of gas through the gap between the first and second assembly modules 1101 and 1102, whereas the remaining portion of the second boundary region 1192*a* in which the second grooves G2 are formed may guarantee the in-plane flow of gas introduced into the third and fourth gas diffusion modules 1151 and 1152, thereby preventing turbulence.

In an embodiment of the present disclosure illustrated in FIG. 13, the first boundary region 1191*a* may have a structure including a first nonporous elastic layer 1191*aa* that contacts the first and second sub-gasket modules 1161 and 1162 and a first porous elastic layer 1191*ab* on the first nonporous elastic layer 1191*aa,* i.e., a double layer structure. The first nonporous elastic layer 1191*aa* may serve as a sealing member that prevents leakage/flow of gas through the gap between the first and second assembly modules 1101 and 1102, whereas the first porous elastic layer 1191*ab* may guarantee the in-plane flow of gas introduced into the first and second gas diffusion modules 1141 and 1142, thereby preventing turbulence.

Similarly, the second boundary region 1192*a* may have a double layer structure including a second nonporous elastic layer 1192*aa* that contacts the third and fourth sub-gasket modules 1171 and 1172 and a second porous elastic layer 1192*ab* on the second nonporous elastic layer 1192*aa*. The second nonporous elastic layer 1192*aa* may serve as a sealing member that prevents leakage/flow of gas through the gap between the first and second assembly modules 1101 and 1102, whereas the second porous elastic layer 1192*ab* may guarantee the in-plane flow of gas introduced into the third and fourth gas diffusion modules 1151 and 1152, thereby preventing turbulence.

Each of the first and second nonporous elastic layers 1191*aa* and 1192*aa* that serve as the sealing members may be formed of an elastic material such as rubber (e.g., EPDM rubber). Each of the first and second porous elastic layers 1191*ab* and 1192*ab* that provide the flow path may also be formed of an elastic material such as rubber, and includes a plurality of pores having a size capable of allowing gas to flow therethrough (e.g., a pore diameter of 1 to 1000 μm).

The invention claimed is:

1. A membrane-electrode assembly comprising:

a first electrode;

a second electrode; and an electrolyte membrane between the first and second electrodes, wherein the first electrode comprises first and second electrode modules separable from each other the electrolyte membrane comprises first and second membrane modules separable from each other, the second electrode comprises third and fourth electrode modules separable from each other, the membrane-electrode assembly comprises first and second assembly modules separable from each other, the first assembly module comprises the first electrode module, the third electrode module, and the first membrane module between the first and third electrode modules, the second assembly module comprises the second electrode module, the fourth electrode module, and the second membrane module between the second and fourth electrode modules, the first membrane module has a first active region in contact with the first and third electrode modules and a first non-active region surrounding the first active region, the second membrane module has a second active region in contact with the second and fourth electrode modules and a second non-active region surrounding the second active region, the first assembly module further comprises, first and third sub-gasket modules disposed in the first non-active region of the first membrane module, the first and third sub-gasket modules surrounding the first and third electrode modules, respectively;

a first gas diffusion module covering the first electrode module, the first electrode module being disposed between the first membrane module and the first gas diffusion module; and a third gas diffusion module covering the third electrode module, the third electrode module being disposed between the first membrane module and the third gas diffusion module, the second assembly module further comprises:

second and fourth sub-gasket modules disposed in the second non-active region of the second membrane module, the second and fourth sub-gasket modules surrounding the second and fourth electrode modules, respectively, a second gas diffusion module covering the second electrode module, the second electrode module being disposed between the second membrane module and the second gas diffusion module; and a fourth gas diffusion module covering the fourth electrode module, the fourth electrode module being disposed between the second membrane module and the fourth gas diffusion module, and the membrane-electrode assembly further comprises:

a first elastic gasket having first and second windows configured respectively to allow the first gas diffusion module and the second gas diffusion module to be exposed therethrough, the first elastic gasket being in contact with the first and second sub-gasket modules; and a second elastic gasket having third and fourth windows configured respectively to allow the third gas diffusion module and the fourth gas diffusion module to be exposed therethrough, the second elastic gasket being in contact with the third and fourth sub-gasket modules.

2. The membrane-electrode assembly according to claim 1, wherein the first elastic gasket comprises a first boundary region between the first and second windows, the first boundary region being in contact with both the first and second sub-gasket modules so as to prevent leakage of gas through a gap between the first and second assembly modules, the second elastic gasket comprises a second boundary region between the third and fourth windows, the second boundary region being in contact with both the third and fourth sub-gasket modules so as to prevent leakage of gas through the gap between the first and second assembly modules, the first boundary region has a plurality of first grooves configured to allow the first and second windows to fluidly communicate with each other therethrough on a surface thereof opposite a surface that contacts the first and second sub-gasket modules, and the second boundary region has a plurality of second grooves configured to allow the third and fourth windows to fluidly communicate with each other therethrough on a surface thereof opposite a surface that contacts the third and fourth sub-gasket modules.

3. The membrane-electrode assembly according to claim 1, wherein the first elastic gasket comprises a first boundary region between the first and second windows, the first boundary region being in contact with both the first and second sub-gasket modules so as to prevent leakage of gas through a gap between the first and second assembly modules, the second elastic gasket comprises a second boundary region between the third and fourth windows, the second boundary region being in contact with both the third and fourth sub-gasket modules so as to prevent leakage of gas through the gap between the first and second assembly modules, the first boundary region comprises a first nonporous elastic layer in contact with the first and second sub-gasket modules and a first porous elastic layer on the first nonporous elastic layer, and the second boundary region comprises a second nonporous elastic layer in contact with the third and fourth sub-gasket modules and a second porous elastic layer on the second nonporous elastic layer.

4. A method of manufacturing a membrane-electrode assembly, the method comprising:

forming a first electrode on a first surface of an electrolyte membrane; and forming a second electrode on a second surface of the electrolyte membrane, the second surface being opposite the first surface, wherein the first electrode comprises first and second electrode modules separable from each other, the second electrode comprises third and fourth electrode modules separable from each other, the electrolyte membrane comprises first and second membrane modules separable from each other, the first membrane module having a first active region in contact with the first and third electrode modules and a first non-active region surrounding the first active region, the second membrane module having a second active region in contact with the second and fourth electrode modules and a second non-active region surrounding the second active region, the forming the first electrode comprises:

forming the first electrode module on a first surface of the first membrane module; and forming the second electrode module on a first surface of the second membrane module, the forming the second electrode comprises:

forming the third electrode module on a second surface of the first membrane module; and forming the fourth electrode module on a second surface of the second membrane module, the method further comprises:

forming first and third sub-gasket modules respectively surrounding the first and third electrode modules in the first non-active region of the first membrane module;

forming first and third gas diffusion modules on the first and third electrode modules, respectively, in order to obtain a first assembly module which comprises the first electrode module the third electrode module, the first membrane module between the first and third electrode modules, the first and third sub-gasket modules, and first and third gas diffusion modules;

forming second and fourth sub-gasket modules respectively surrounding the second and fourth electrode modules in the second non-active region of the second membrane module;

forming second and fourth gas diffusion modules on the second and fourth electrode modules, respectively, in order to obtain a second assembly module which comprises the second electrode module, the fourth electrode module, the second membrane module between the second and fourth electrode modules, the second and fourth sub-gasket modules, and the second and fourth gas diffusion modules;

arranging the first and second assembly modules in such a way that the first and second assembly modules are adjacent to each other;

forming a first elastic gasket having first and second windows configured respectively to allow the first and second gas diffusion modules to be exposed therethrough on the first and second sub-gasket modules; and forming a second elastic gasket having third and fourth windows configured respectively to allow the third and fourth gas diffusion modules to be exposed therethrough on the third and fourth sub-gasket modules.

5. The method according to claim 4, wherein the first elastic gasket comprises a first boundary region between the first and second windows, the first boundary region being in contact with both the first and second sub-gasket modules so as to prevent leakage of gas through a gap between the first and second assembly modules, the second elastic gasket comprises a second boundary region between the third and fourth windows, the second boundary region being in contact with both the third and fourth sub-gasket modules so as to prevent leakage of gas through the gap between the first and second assembly modules, the first boundary region has (i) a flow path structure having a plurality of first grooves configured to allow the first and second windows to fluidly communicate with each other therethrough on a surface thereof opposite a surface that contacts the first and second sub-gasket modules or (ii) a double layer structure comprising a first nonporous elastic layer in contact with the first and second sub-gasket modules and a first porous elastic layer on the first nonporous elastic layer, and the second boundary region has (i) a flow path structure having a plurality of second grooves configured to allow the third and fourth windows to fluidly communicate with each other therethrough on a surface thereof opposite a surface that contacts the third and fourth sub-gasket modules or (ii) a double layer structure comprising a second nonporous elastic layer in contact with the third and fourth sub-gasket modules and a second porous elastic layer on the second nonporous elastic layer.

* * * * *